Patented Sept. 28, 1937

2,094,558

UNITED STATES PATENT OFFICE 2,094,558

METHOD OF PRODUCING CORNSTARCH CONVERSION PRODUCTS

Raymond E. Daly and James F. Walsh, Chicago, Ill., assignors to American Maize-Products Company, a corporation of Maine No Drawing. Application June 30, 1936, Serial No. 88,114

7 Claims. (Cl. 127—39)

Heretofore in the manufacture of corn syrup or corn sugar of good quality it has been universally accepted in the trade that one must use a cornstarch carefully purified of protein matter (gluten). Since the only available method of separating gluten and starch has been through their difference in specific gravity, the removal of the gluten ordinarily involves a slow, cumbersome operation known as tabling, demanding a large amount of floor space, and this process involves very considerable expense; but nevertheless it has been considered to be an essential step in the production of starch conversion products.

We have invented a new method of producing conversion products of a purity equal to those heretofore produced and at a greatly reduced cost, and this invention is based on our discovery that the insoluble protein material (gluten) has so little effect on the conversion operation that it can be ignored, and the real requirement for the treatment of starch preparatory to conversion is the removal of the soluble bodies, particularly the removal of the soluble proteins together with the protein decomposition products which usually are classed with the proteins in this industry. In making this statement we are presuming that the starch will be produced according to usual processes in accordance with which the germ is first removed eliminating the bulk of the oil, after which the fiber of the hull is separated from the starch and the starch is prepared in finely divided form.

Under our process the starch in the form just described, which is known as mill-house starch or table-head starch, is subjected to repeated washings and filterings with the wash water and the make-up water between each filtering operation preferably being fresh water. In this way, by carefully washing the finely divided starch, solubles can be reduced to a very low figure and the starch prepared for conversion. In actual operations we have found that it is advisable to reduce the solubles to a total of not more than about 0.3% (on a dry basis) and the soluble protein should be reduced to not more than about 0.1%. Preferably the purification is carried even farther and we have found that it is commercially feasible to produce washed starch having a total of soluble solids of not over about .12% and a total of soluble protein in the order of about .07% or less. It may be noted that the soluble protein figure compares approximately with the soluble proteins in the regular purified starch used for conversion while the total soluble solids of our process may be somewhat lower. At the same time the insoluble protein will ordinarily remain as 4% or more, whereas, in the usual conversion process the total protein figure is not more than about 0.5%.

After the mill-house starch has been thoroughly washed to remove solubles as above described, it is subjected to conversion aimed either to the production of sugar or syrup, using a highly ionizable acid such as hydrochloric acid in an approximately standard manner. Although the presence of the protein may slightly slow up the conversion operation, in general the times and temperatures of treatment will fall within the limits usually set forth for standard operations.

Following the conversion, the conversion liquor is neutralized (say to a pH value of about 4.5 to 5) to cause a coagulation of the gluten matter which it is usually best to remove by filtration. This coagulation and removal at this stage greatly reduces subsequent difficulties in handling during evaporation, but for some purposes, as for use in fermentation, some protein content may have value. The solids obtained on this removal will have a high percentage of protein and some oil as well as other bodies, but will be practically free from starch and the separation at this point is simpler and much more efficient than separation prior to conversion. The solid matter resulting from this separation may be used for food products or may have valuable qualities for industrial purposes or as a source of zein.

The conversion liquor, freed from the solid protein bodies, ordinarily will be further purified by standard methods such as by passing it through bone-char or vegetable decolorizing carbons, after which it is concentrated and treated in usual fashion.

Our invention can be readily understood from the following example which is given only by way of illustration:

As a starting point for this process we employed ordinary mill-house starch which was concentrated in a filter press. This starch showed a total protein content on the dry basis of about 7.7% of which about 0.69% was soluble protein. The total soluble solids amounted to slightly more than 1%. This starch was treated on a shaker and then given three successive washings on vacuum washing filters. The first two washings were on what is known as the "American type" filters and the last washing on what is known as the "Oliver type" filter. In each case the make-up water added for the succeeding filtration and also the wash water was clean water.

As a result of these operations, a starch was obtained which on the dry basis contained total protein of 4.36%, soluble protein of 0.058% and total soluble solids of 0.115%. This may be compared with an analysis of starch which had been prepared for conversion by the regular tabling operations, which showed a total protein content of 0.42%, a soluble protein content of 0.05% and a total content of soluble solids of 0.30%.

The starch resulting from the washing operations above described was made up to a suspension of 14° Bé. and sent to the refinery. Here a charge of 1950 gallons of this suspension had added to it 130 pounds of concentrated hydrochloric acid for each conversion. A standard pressure of 45 pounds of steam was applied for an average of 19 minutes under pressure. This time is within the range of time required for conversion of regular sugar starch. The resulting liquor was neutralized to a pH of about 4.8 by the addition of 50 pounds of soda ash. The resulting liquid, after filtration, showed a purity of about 90% and when finished according to standard practice gave a cereal sugar which was perfectly normal in appearance, taste and feel. The purity of the sugar averaged about 99.9% and the product was up to standard, comparing favorably with regular production.

The filter mud resulting from the filtration of the converted liquid after neutralization was bleached and dried. It then showed a total protein content of about 55% and a content of protein which was soluble in 80% alcohol of about 37%. This solid material was free of starch, showing that all the starch of the process had been made available to conversion so that the process involved no measurable loss of starch carried over with the gluten, whereas the usual operations now practiced involve loss to conversion of from one to two (or even more) pounds of starch per bushel of corn ground.

It is to be understood that the above example is given only by way of illustration and that the methods of washing may be widely varied and that the steps of conversion may be adapted to produce different types of sugars and syrups as is well understood in the art. Further, many other modifications and changes may be made in the details given without departing from the spirit of our invention.

The analyses made in connection with this invention include figures for soluble and insoluble proteins. The percentages given are based on an analysis made by determining nitrogen according to Kjeldahl method and then calculating the amount of protein from the nitrogen present, based on the arbitrary factor of 6.25 which is a commonly accepted factor used in the industry. Actually, some of the so-called protein bodies probably are more correctly termed protein derivatives, particularly the proteins remaining in conversion liquid prior to coagulation. However, it is understood that the term protein is used in its broad sense and not in any narrow or restricted meaning.

What we claim is:

1. The method of producing cornstarch conversion products which involves the steps of preparing a mixture of starch and gluten from which the germ and fiber have been removed, washing such mixture to reduce the content of soluble solids to not more than 0.3% on a dry basis, treating such starch and insoluble gluten material with a highly ionizable acid to convert the starch and render the same soluble, neutralizing to coagulate the protein matter, filtering to remove such coagulated protein and concentrating.

2. A process as specified in claim 1, in which the washing operation is conducted so as to reduce the percentage of soluble matter to not more than 0.12%.

3. The method of producing cornstarch conversion products and protein bodies of value, which involves preparing a mixture of starch and protein matter comprising at least 4% of insoluble proteins and not more than 0.1% of soluble proteins, converting such starch with highly ionizable acid while in the presence of such insoluble proteins, neutralizing to approximately the iso-electric point of the proteins to coagulate the same and filtering to remove such proteins from the converted starch solution.

4. A method as specified in claim 3, in which the soluble protein content of the mixture of starch and protein is reduced to not over 0.07%.

5. A method as specified in claim 3, in which the conversion liquid is neutralized to a pH value of between 4.5 and 5 to coagulate the protein bodies.

6. A process of producing conversion products from corn without any tabling operations and without removal of the insoluble proteins from the corn before conversion, comprising treating the corn to effect removal of the bulk of the oil and fiber constituents leaving a mixture of starch, water soluble proteins and water insoluble proteins, thoroughly washing this mixture with water to remove substantially all of said soluble proteins, and treating the remaining mixture of starch and insoluble proteins with a starch conversion acid, heat and pressure for sufficient time to effect the desired degree of conversion of said starch.

7. A process of producing conversion products from corn without any tabling operations and without removal of the insoluble proteins from the corn before conversion, comprising treating the corn to effect removal of the bulk of the oil and fiber constituents leaving a mixture of starch, water soluble proteins and water insoluble proteins, thoroughly washing this mixture with water to remove substantially all of said soluble proteins, and treating the remaining mixture of starch and insoluble proteins with a starch conversion acid, heat and pressure for sufficient time to effect the desired degree of conversion of said starch, neutralizing the conversion mixture to effect coagulation of the solubilized proteins resulting from conversion, and filtering to remove the coagulum.

RAYMOND E. DALY.
JAMES F. WALSH.